(12) United States Patent
Liu et al.

(10) Patent No.: US 10,021,653 B2
(45) Date of Patent: Jul. 10, 2018

(54) TRANSMIT POWER DETERMINING METHOD AND APPARATUS

(71) Applicant: Huawei Technologies Co., Ltd., Shenzhen, Guangdong (CN)

(72) Inventors: Weiqiang Liu, Shanghai (CN); Tongbo Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/531,370

(22) PCT Filed: Oct. 28, 2015

(86) PCT No.: PCT/CN2015/093092
§ 371 (c)(1),
(2) Date: May 26, 2017

(87) PCT Pub. No.: WO2016/082647
PCT Pub. Date: Jun. 2, 2016

(65) Prior Publication Data
US 2017/0332334 A1 Nov. 16, 2017

(30) Foreign Application Priority Data
Nov. 27, 2014 (CN) .......................... 2014 1 0714139

(51) Int. Cl.
*H04W 52/20* (2009.01)
*H04W 52/22* (2009.01)
*H04W 88/04* (2009.01)

(52) U.S. Cl.
CPC ......... *H04W 52/20* (2013.01); *H04W 52/225* (2013.01); *H04W 88/04* (2013.01)

(58) Field of Classification Search
CPC ... H04W 52/225; H04W 88/04; H04W 52/20; H04W 72/04; H04W 72/0446; H04W 72/085
(Continued)

(56) References Cited

U.S. PATENT DOCUMENTS

2002/0198014 A1* 12/2002 Miyamoto ............ H04W 52/12
455/522
2010/0058132 A1 3/2010 Kumar
2013/0136018 A1 5/2013 Jeong et al.

FOREIGN PATENT DOCUMENTS

CN 1691533 A 11/2005
CN 103916943 A 7/2014
(Continued)

*Primary Examiner* — Keith Ferguson

(57) ABSTRACT

A transmit power determining method and apparatus are disclosed. The method includes: calculating, channel state information of a channel between the wireless access point device and a station device within a particular time range; comparing, by the wireless access point device, the channel state information with pre-obtained reference channel state information, and adjusting, according to a result of the comparison, a transmit power currently used by the wireless access point device; and sending, by the wireless access point device to the station device by using a transmit power after the adjustment, a message carrying data. During implementation of the present disclosure, a transmit power for sending data can be adjusted according to channel state information corresponding to a channel between a wireless access point device and a station device, thereby avoiding unnecessary power overheads and a waste of energy.

12 Claims, 4 Drawing Sheets

(58) Field of Classification Search
USPC ..... 455/522, 69, 68, 500, 517, 67.11, 67.13,
455/507, 445, 508, 509, 515, 550.1,
455/422.1, 403, 426.1, 426.2; 370/310,
370/252, 329, 328, 343, 337
See application file for complete search history.

(56) References Cited

FOREIGN PATENT DOCUMENTS

WO         2011103513 A1    8/2011
WO    WO 2011096764 A2 *   8/2011  ............. H04B 7/026

\* cited by examiner

TRANSMIT POWER DETERMINING METHOD AND APPARATUS

CROSS-REFERENCE TO RELATED APPLICATIONS

This application is a National Stage of International Application No. PCT/CN2015/093092, filed on Oct. 28, 2015, which claims priority to Chinese Patent Application No. 201410714139.2, filed on Nov. 27, 2014. The disclosures of the aforementioned applications are hereby incorporated by reference in their entireties.

TECHNICAL FIELD

The present disclosure relates to the field of communications technologies, and in particular, to a transmit power determining method and apparatus.

BACKGROUND

With continuous development of wireless communications technologies, Wireless Fidelity (WiFi) has become a wireless communication means widely used by intelligent devices. A user can use an intelligent device with a built-in WiFi function, that is, a WiFi device, as a hotspot (soft AP), for example, to share 3G data by using the WiFi device such as a wireless router or a mobile phone. It is convenient for the user to use the WiFi device in a mobile environment, for example, during travelling or mobile working, to implement interconnection between the WiFi device and the Internet.

Currently, when serving as a hotspot for sending data, the WiFi device generally uses a fixed maximum transmit power. However, in an actual application, a status of a channel between the hotspot and a station (STA) is not fixed. For example, when a distance between the hotspot and the STA is relatively short, the hotspot does not need to use the maximum transmit power when sending data; if the hotspot still uses the maximum transmit power, unnecessary power overheads and energy waste are caused.

SUMMARY

Embodiments of the present disclosure disclose a transmit power determining method and apparatus, so as to adjust a transmit power according to current channel state information, to reduce power overheads.

A first aspect of the embodiments of the present disclosure discloses a transmit power determining method, including:

calculating, by a wireless access point device, channel state information of a channel between the wireless access point device and a station device within a particular time range, where the channel state information is used to indicate a frame error rate of data transmission on the channel within the particular time range;

comparing, by the wireless access point device, the channel state information with pre-obtained reference channel state information, and adjusting, according to a result of the comparison, a transmit power currently used by the wireless access point device; and sending, by the wireless access point device to the station device by using a transmit power after the adjustment, a message carrying data.

With reference to the first aspect, in a first possible implementation manner, the calculating, by a wireless access point device, channel state information of a channel between the wireless access point device and a station device within a particular time range includes:

receiving, by the wireless access point device, an acknowledgement ACK frame returned by the station device in response to a message frame that is sent by the wireless access point device on the channel;

calculating, by the wireless access point device, the frame error rate of the channel within the particular time range according to a quantity of message frames that are sent by the wireless access point device to the station device on the channel within the particular time range and a quantity of acknowledgement ACK frames received within the particular time range; and using, by the wireless access point device, the frame error rate as the channel state information of the channel.

With reference to the first aspect or the first possible implementation manner of the first aspect, in a second possible implementation manner, the adjusting, according to a result of the comparison, a transmit power currently used by the wireless access point device includes:

performing, by the wireless access point device according to a pre-obtained adjustment mapping relationship, an adjustment operation, which corresponds to the result of the comparison, on the transmit power currently used by the wireless access point device, where the adjustment mapping relationship is a pre-obtained mapping relationship between a comparison result and an adjustment operation.

With reference to the second possible implementation manner of the first aspect, in a third possible implementation manner, the pre-obtained reference channel state information includes a frame error rate threshold; and the performing, by the wireless access point device according to a pre-obtained adjustment mapping relationship, an adjustment operation, which corresponds to the result of the comparison, on the transmit power currently used by the wireless access point device includes:

when the result of the comparison is that the frame error rate is less than the frame error rate threshold, adjusting, by the wireless access point device, the transmit power for sending, to the station device, the message carrying data to a transmit power that is less than the currently used transmit power by a preset power value.

With reference to the second possible implementation manner of the first aspect, in a fourth possible implementation manner, the pre-obtained reference channel state information includes a frame error rate threshold; and the performing, by the wireless access point device according to a pre-obtained adjustment mapping relationship, an adjustment operation, which corresponds to the result of the comparison, on the transmit power currently used by the wireless access point device includes:

when the result of the comparison is that the frame error rate is greater than the frame error rate threshold, adjusting, by the wireless access point device, the transmit power for sending, to the station device, the message carrying data to a transmit power that is greater than the currently used transmit power by a preset power value.

A second aspect of the embodiments of the present disclosure discloses a transmit power adjustment apparatus, including:

an information obtaining module, configured to calculate channel state information of a channel between the wireless access point device and a station device within a particular time range, where the channel state information is used to indicate a frame error rate of data transmission on the channel within the particular time range;

a power adjustment module, configured to compare the channel state information obtained by the information obtaining module with pre-obtained reference channel state information, and adjust, according to a result of the comparison, a transmit power currently used by the wireless access point device; and a message sending module, configured to send, to the station device by using a transmit power after the adjustment by the power adjustment module, a message carrying data.

With reference to the second aspect, in a first possible implementation manner, the information obtaining module includes:

a receiving unit, configured to receive an acknowledgement ACK frame returned by the station device in response to a message frame that is sent by the wireless access point device on the channel;

a calculation unit, configured to calculate the frame error rate of the channel within the particular time range according to a quantity of message frames that are sent by the wireless access point device to the station device on the channel within the particular time range and a quantity of acknowledgement ACK frames received by the receiving unit within the particular time range; and an information determining unit, configured to use the frame error rate as the channel state information of the channel.

With reference to the second aspect or the first possible implementation manner of the second aspect, in a second possible implementation manner, the power adjustment module includes:

a comparison unit, configured to compare the channel state information obtained by the information obtaining module with the pre-obtained reference channel state information; and an adjustment unit, configured to perform, according to a pre-obtained adjustment mapping relationship, an adjustment operation, which corresponds to the result of the comparison, on the transmit power currently used by the wireless access point device, where the adjustment mapping relationship is a pre-obtained mapping relationship between a comparison result and an adjustment operation.

With reference to the second possible implementation manner of the second aspect, in a third possible implementation manner, the pre-obtained reference channel state information includes a frame error rate threshold; and the adjustment unit is specifically configured to:

when the result of the comparison is that the frame error rate is less than the frame error rate threshold, adjust the transmit power for sending, to the station device, the message carrying data to a transmit power that is less than the currently used transmit power by a preset power value.

With reference to the second possible implementation manner of the second aspect, in a fourth possible implementation manner, the pre-obtained reference channel state information includes a frame error rate threshold; and the adjustment unit is specifically configured to:

when the result of the comparison is that the frame error rate is greater than the frame error rate threshold, adjust the transmit power for sending, to the station device, the message carrying data to a transmit power that is greater than the currently used transmit power by a preset power value.

Compared with the prior art, the embodiments of the present disclosure have the following advantageous effects:

According to the embodiments of the present disclosure, state information of a channel between a wireless access point device and a station device may be obtained, and the channel state information is compared with pre-obtained reference channel state information; therefore, a transmit power currently used by the wireless access point device is adjusted according to a result of the comparison, a transmit power corresponding to the channel state information is determined, and a message is sent to the station device based on a transmit power after the adjustment. In this way, the transmit power for sending the message may be adjusted according to a status of the channel between the wireless access point device and the station device. Therefore, unnecessary power overheads and a waste of energy are avoided.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Embodiments of the present disclosure disclose a transmit power determining method and apparatus, and a wireless access point device, which can adjust, according to a channel status corresponding to a channel between a wireless access point device and a station device, a transmit power currently used by the wireless access point device, thereby avoiding unnecessary power overheads and a waste of energy. Detailed descriptions are provided below separately.

Figure 1:
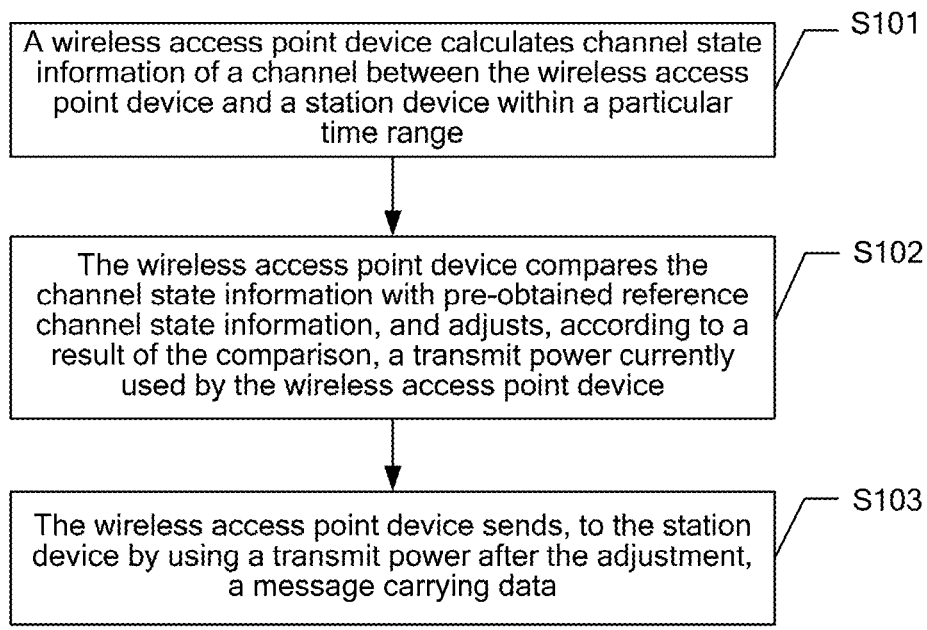
FIG. 1 is a schematic flowchart of a transmit power determining method according to an embodiment of the present disclosure.

Referring to FIG. 1, FIG. 1 is a schematic flowchart of a transmit power determining method according to an embodiment of the present disclosure. The method in this embodiment of the present disclosure can be specifically applied to a wireless access point device. The transmit power determining method shown in FIG. 1 may include the following steps.

S101: A wireless access point device calculates channel state information of a channel between the wireless access point device and a station device within a particular time range.

It should be noted that the wireless access point device includes, but is not limited to, a device that can serve as a hotspot, such as a mobile phone, a tablet computer, or a wireless router. The channel state information is used to indicate a frame error rate of data transmission on the channel within the particular time range.

S102: The wireless access point device compares the channel state information with pre-obtained reference channel state information, and adjusts, according to a result of the comparison, a transmit power currently used by the wireless access point device.

In an optional embodiment, when serving as a hotspot, the wireless access point device, for example, a mobile phone, can calculate the channel state information of the channel between the wireless access point device and the station device within the particular time range, for example, calculate a frame error rate, within the particular time range, corresponding to a status of a downlink corresponding to the wireless access point device, to adjust a transmit power for sending data to the station device. The frame error rate is a parameter used to indicate a probability of failing to send data in a process of data transmission between the wireless access point device and the station device, and the station device may be a terminal device, such as a mobile phone or a tablet computer.

Specifically, when the wireless access point device compares the channel state information, which is obtained through calculation, with the pre-obtained reference channel state information, and adjusts the currently used transmit power according to the result of the comparison, the wireless access point device may reduce the transmit power currently used by the wireless access point device when the channel state information is superior to the reference channel state information and a channel status is relatively good, that is, the frame error rate obtained through calculation is relatively low; and the wireless access point device increases the currently used transmit power when the channel state information is not superior to the reference channel state information and a channel status is relatively poor, that is, the obtained frame error rate is relatively high, so as to implement a real-time adjustment to the data transmit power according to the status of the channel between the wireless access point device and the station device, and reduce unnecessary power overheads.

S103: The wireless access point device sends, to the station device by using a transmit power after the adjustment, a message carrying data.

Specifically, after adjusting the currently used transmit power according to the channel state information obtained through calculation, the wireless access point device may send, to the station device according to the transmit power determined by means of the adjustment, the message carrying data.

During implementation of this embodiment of the present disclosure, state information of a channel between a wireless access point device and a station device may be obtained, and the channel state information is compared with pre-obtained reference channel state information; therefore, a transmit power currently used by the wireless access point device is adjusted according to a result of the comparison, a transmit power corresponding to the channel state information is determined, and a message is sent to the station device based on a transmit power after the adjustment. In this way, the transmit power for sending the message may be adjusted according to a status of the channel between the wireless access point device and the station device. Therefore, unnecessary power overheads and a waste of energy are avoided.

Figure 2:
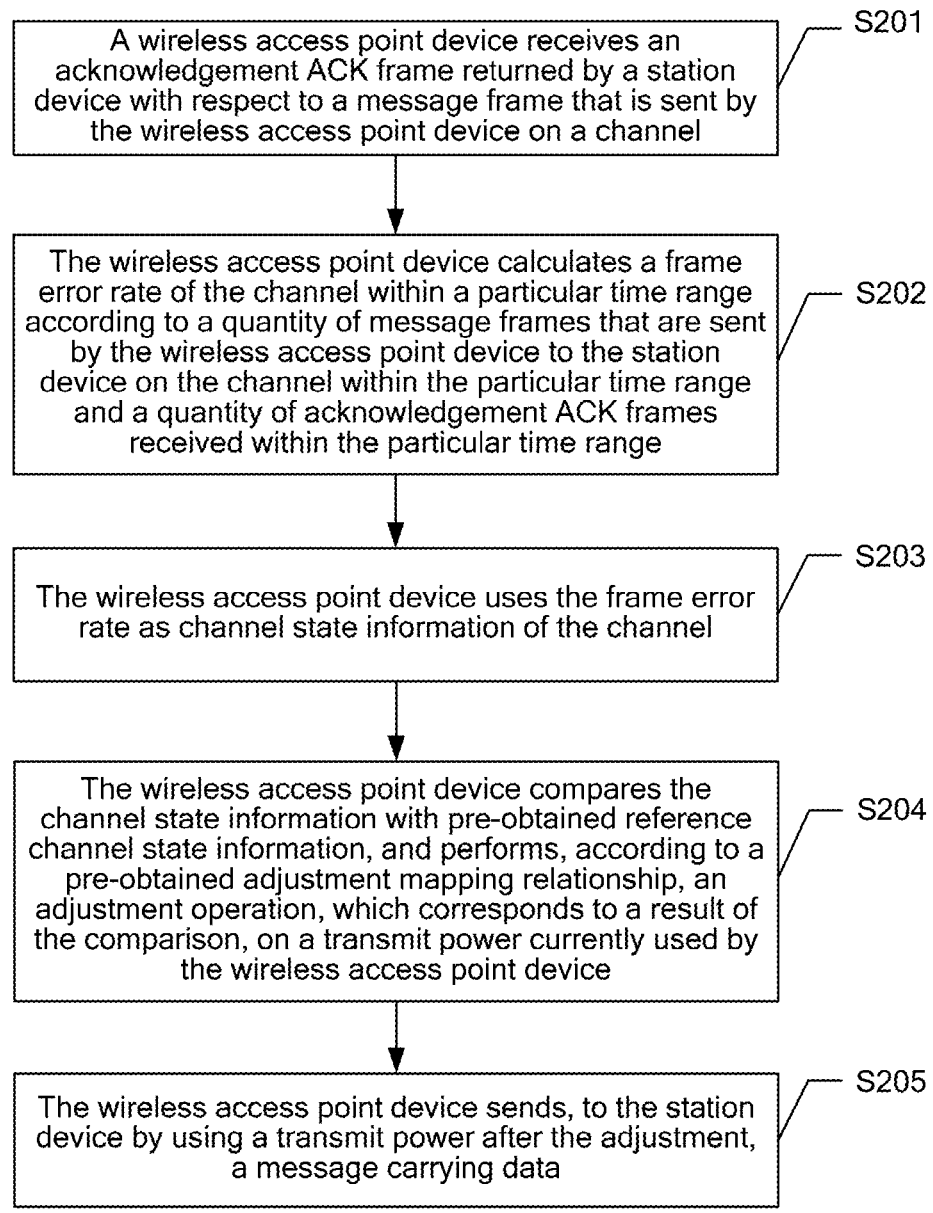
FIG. 2 is a schematic flowchart of another transmit power determining method according to an embodiment of the present disclosure.

Referring to FIG. 2, FIG. 2 is a schematic flowchart of another transmit power determining method according to an embodiment of the present disclosure. Specifically, the transmit power determining method shown in FIG. 2 may include the following steps.

S201: A wireless access point device receives an acknowledgement ACK frame returned by a station device in response to a message frame that is sent by the wireless access point device on a channel.

Because an error easily occurs when data is transmitted on wireless media, a data/ACK (Acknowledgement) frame exchange mechanism is defined in the Institute of Electrical and Electronics Engineers (IEEE) 802.11 protocol suite. It is specified in the IEEE 802.11 protocol suite that, when the station device correctly receives a message frame sent by the wireless access point device, the station device needs to send an acknowledgement ACK frame to a data transmit end, that is, the wireless access point device, to notify the wireless access point device that the message frame is correctly received. If the wireless access point device does not receive the corresponding ACK frame, it may indicate that sending of the message frame fails. The message frame may be specifically a data frame carrying data.

In an optional embodiment, after sending the message frame to the station device, the wireless access point device may monitor a response status of the station device, and receive information about the acknowledgement ACK frame that is returned by the station device in response to the message frame, so that state information of the current channel between the wireless access point device and the station device is determined according to the information about the ACK frame.

S202: The wireless access point device calculates a frame error rate of the channel within a particular time range according to a quantity of message frames that are sent by the wireless access point device to the station device on the channel within the particular time range and a quantity of acknowledgement ACK frames received within the particular time range.

S203: The wireless access point device uses the frame error rate as channel state information of the channel.

Based on the ACK frame mechanism, the wireless access point device may obtain, by means of statistics collection according to the information about the received ACK frames, the frame error rate used to record a probability of failing to send data in a process of data transmission between the wireless access point device and the station device, and determine the state information of the channel between the wireless access point device and the station device according to the frame error rate, to further determine the data transmit power according to the channel state information. Specifically, when sending a message frame to the station device, the wireless access point device may record sending information about the message frame, for example, a quantity of sent message frames, and receive an ACK frame that is fed back by the station device in response to the message frame; obtains a frame error rate corresponding to the channel between the wireless access point device and the station device, according to a quantity of message frames sent and a quantity of ACK frames received by the wireless access point device within the particular time range, for example, five minutes; and determines the frame error rate as the channel state information. Optionally, the wireless access point device may further receive a non-acknowledgement NACK frame that is fed back by the station device in response to the message frame, and collect statistics on the frame error rate of the channel within the particular time range according to a quantity of NACK frames and a quantity of ACK frames that are received by the wireless access point device within the particular time range.

S204: The wireless access point device compares the channel state information with pre-obtained reference channel state information, and performs, according to a pre-obtained adjustment mapping relationship, an adjustment operation, which corresponds to a result of the comparison, on a transmit power currently used by the wireless access point device.

The adjustment mapping relationship is a pre-obtained mapping relationship between a comparison result and an adjustment operation.

Further, the pre-obtained reference channel state information may include a frame error rate threshold; then, the wireless access point device may compare the frame error rate, which is obtained through calculation, with the frame error rate threshold, and perform, according to the pre-obtained adjustment mapping relationship, an adjustment operation, which corresponds to the result of the comparison, on the transmit power currently used by the wireless access point device.

Optionally, when the wireless access point device performs, according to the pre-obtained adjustment mapping relationship, an adjustment operation, which corresponds to the result of the comparison, on the transmit power currently used by the wireless access point device, if the result of the comparison between the frame error rate and the frame error rate threshold is that the frame error rate is less than the frame error rate threshold, the wireless access point device may adjust the transmit power for sending, to the station device, the message carrying data to a transmit power that is less than the currently used transmit power by a preset power value.

Optionally, when the wireless access point device performs, according to the pre-obtained adjustment mapping relationship, an adjustment operation, which corresponds to the result of the comparison, on the transmit power currently used by the wireless access point device, if the result of the comparison between the frame error rate and the frame error rate threshold is that the frame error rate is greater than the frame error rate threshold, the wireless access point device may adjust the transmit power for sending, to the station device, the message carrying data to a transmit power that is greater than the currently used transmit power by a preset power value.

In a specific embodiment, when the frame error rate obtained through calculation is less than or greater than the frame error rate threshold, that is, when the transmit power currently used by the wireless access point device needs to be adjusted, the preset power values may be added to or subtracted from the currently used transmit power successively, to increase or reduce the transmit power, until an ACK frame returned when the station device acknowledges that data is successfully sent is received. For example, when the frame error rate of the channel between the wireless access point device and the station device is greater than the frame error rate threshold, that is, the status of the channel between the wireless access point device and the station device is relatively poor, the transmit power for sending data to the station device may be adjusted according to the preset power value. For example, the transmit power is first increased by one preset power value, a message is sent according to a transmit power after the adjustment, and it is detected whether an ACK frame that is returned by the station device in response to the sent message is received. If the ACK frame is not received, that is, sending of data fails, the data may be sent after the transmit power is increased by one preset power value again, and it is detected whether an ACK frame returned by the station device is received. This step is repeated, until an ACK frame returned by the station device is received, that is, until the data is successfully sent. The currently used transmit power may be specifically a preset fixed transmit power value, and each time the transmit power of the wireless access point is adjusted, the preset power values may be added to or subtracted from the fixed transmit power value successively; or the currently used transmit power is a transmit power used when the wireless access point device sends a previous message, and when the currently used transmit power is adjusted, the preset power value may be added to or subtracted from the transmit power used for sending the previous message.

Further, considering a problem that the transmit power is limited, a maximum transmit power and a minimum transmit power may be further set for the wireless access point device. When the transmit power currently used by the wireless access point device is adjusted, if a transmit power after the adjustment is greater than the maximum transmit power, the maximum transmit power is determined as the transmit power for sending data to the station device; or if a transmit power after the adjustment is less than the minimum transmit power, the minimum transmit power is determined as the transmit power for sending data to the station device, so that the transmit power of the wireless access point device always falls between the maximum transmit power and the minimum transmit power. The fixed transmit power value may be an intermediate value between the maximum transmit power and the minimum transmit power, or an arbitrary value between the maximum transmit power and the minimum transmit power, which is not limited in this embodiment of the present disclosure.

S205: The wireless access point device sends, to the station device by using a transmit power after the adjustment, a message carrying data.

For example, it is assumed that the frame error rate threshold is T, a minimum scale, that is, the preset power value, for the power adjustment is d, and the transmit power value currently used by the wireless access point device is P. When a frame error rate m obtained by means of statistics collection by the wireless access point device is less than T, it may indicate that a current channel status corresponding to the channel between the wireless access point device and the station device is relatively good; in this case, the transmit power P for sending a message to the station device may be adjusted to $PTx1=P-2d$, and the wireless access point device sends the message to the station device by using the transmit power $PTx1$ after the adjustment, monitors the channel status, and obtains a frame error rate of the channel between the wireless access point device and the station device. If it is detected that $m<T$, the wireless access point device continues to send a message to the station device by using the transmit power $PTx1$ after the adjustment. If it is detected that $m>T$, it may indicate that a current channel status is relatively poor; in this case, the transmit power P for sending the message to the station device may be adjusted to $PTx2=P+d$, and the wireless access point device sends the message to the station device by using the transmit power $PTx2$ after the adjustment, and monitors the channel status.

Correspondingly, when a frame error rate m obtained by means of statistics collection by the wireless access point device is greater than T, it may indicate that a current channel status corresponding to the channel between the wireless access point device and the station device is relatively poor; in this case, the transmit power P for sending a message to the station device may be adjusted to PTx3=P+ 2d, and the wireless access point device sends the message to the station device by using the transmit power PTx3 after the adjustment, monitors the channel status, and obtains a frame error rate of the channel between the wireless access point device and the station device. If it is detected that m>T, the wireless access point device continues to send a data message to the station device by using the transmit power PTx3 after the adjustment. If it is detected that m<T, it may indicate that a current channel status is relatively good; in this case, the transmit power P for sending the message to the station device may be adjusted to PTx4=P−d, and the wireless access point device sends the data message to the station device by using the transmit power PTx4 after the adjustment, and monitors the channel status. That is, when the transmit power of the wireless access point device is adjusted, rapid adjustment of the transmit power may be further implemented by adjusting the transmit power by multiple preset power values each time instead of adding the preset power values to or subtracting the preset power values from the transmit power successively.

It should be noted that, this embodiment of the present disclosure may be specifically applied to a scenario in which the wireless access point device sends a message carrying data, excluding a scenario in which a control frame, such as a beacon frame or an ACK frame, is sent, and when sending the control frame, the wireless access point device may not adjust the current transmit power, and still use an existing transmission mechanism.

Further, if there are multiple station devices currently, when communicating with the multiple station devices, the wireless access point device may distinguish the multiple station devices according to Media Access Control (MAC) addresses corresponding to the station devices, so as to use different transmit powers for the different station devices according to obtained channel state information. Specifically, when the wireless access point device establishes connections to multiple station devices, the wireless access point device may obtain the MAC addresses of the multiple station devices, so that the wireless access point device can distinguish the different station devices according to the MAC addresses, separately obtain frame error rates corresponding to channels to the multiple station devices, and separately adjust, according to the frame error rates, transmit powers for sending messages to the multiple station devices.

Further, optionally, the wireless access point device may further determine a transmit power corresponding to a station device whose channel to the wireless access point device has a highest frame error rate among channels between the wireless access point device and the multiple station devices, that is, a station device having a poorest channel status, and use the determined transmit power as a transmit power used by the wireless access point device all the time (that is, when sending messages to all the station devices, the wireless access point device uses the transmit power corresponding to the station device having the poorest channel status).

During implementation of this embodiment of the present disclosure, a frame error rate corresponding to a status of a downlink between a wireless access point device and a station device may be obtained, a sending power for sending a message to the station device is increased when the frame error rate is relatively high, and the sending power for sending a message to the station device is decreased when the frame error rate is relatively low, so as to adjust a transmit power currently used by the wireless access point device, and to send a message to the station device based on a transmit power after the adjustment, so that the wireless access point device can adjust a message transmit power in real time according to a status of a channel between the wireless access point device and the station device, avoiding unnecessary power overheads and a waste of energy.

Figure 3:
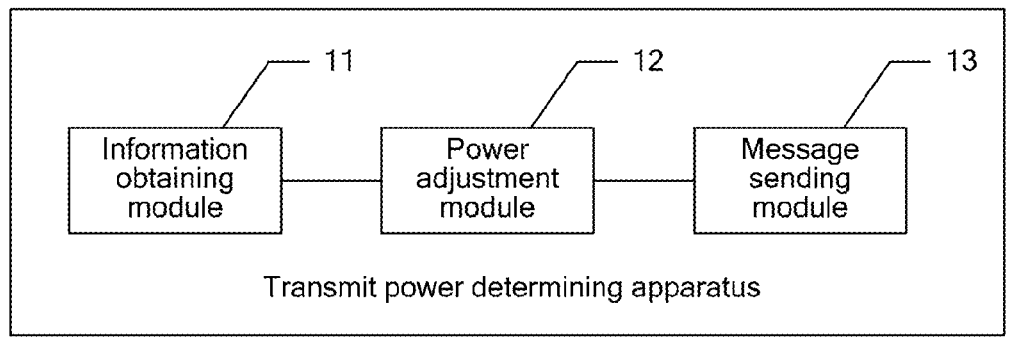
FIG. 3 is a schematic structural diagram of a transmit power determining apparatus according to an embodiment of the present disclosure.

Referring to FIG. 3, FIG. 3 is a schematic structural diagram of a transmit power determining apparatus according to an embodiment of the present disclosure. The apparatus in this embodiment of the present disclosure may be specifically disposed in a wireless access point device. Specifically, the apparatus may include an information obtaining module 11, a power adjustment module 12, and a message sending module 13.

The information obtaining module 11 is configured to calculate channel state information of a channel between the wireless access point device and a station device within a particular time range.

The channel state information is used to indicate a frame error rate of data transmission on the channel within the particular time range.

It should be noted that the wireless access point device includes, but is not limited to, a device that can serve as a hotspot, such as a mobile phone, a tablet computer, or a wireless router.

The power adjustment module 12 is configured to compare the channel state information obtained by the information obtaining module 11 with pre-obtained reference channel state information, and adjust, according to a result of the comparison, a transmit power currently used by the wireless access point device.

In an optional embodiment, when the wireless access point device, for example, a mobile phone, serves as a hotspot, the information obtaining module 11 may obtain the channel state information of the channel between the wireless access point device and the station device within the particular time range, for example, calculate a frame error rate corresponding to a status of a downlink corresponding to the wireless access point device, and the power determining module 12 compares the channel state information obtained by the information obtaining module 11 with the pre-obtained reference channel state information, so that the transmit power currently used by the wireless access point device is adjusted according to the result of the comparison, and a transmit power for sending data to the station device is determined. The frame error rate is a parameter used to indicate a probability of failing to send data in a process of data transmission between the wireless access point device and the station device, and the station device may be a terminal device, such as a mobile phone or a tablet computer.

Specifically, when the power adjustment module 12 compares the channel state information, which is obtained through calculation, with the pre-obtained reference channel state information, and adjusts the currently used transmit power according to the result of the comparison, the power adjustment module 12 may reduce the transmit power currently used by the wireless access point device when the channel state information is superior to the reference channel state information and a channel status is relatively good, that is, the obtained frame error rate is relatively low; and the power adjustment module 12 increases the currently used transmit power when the channel state information is not superior to the reference channel state information and the channel status is relatively poor, that is, the obtained frame error rate is relatively high, so as to implement a real-time adjustment to the data transmit power according to the status of the channel between the wireless access point device and the station device, and reduce unnecessary power overheads.

The message sending module 13 is configured to send, to the station device by using a transmit power after the adjustment by the power adjustment module 12, a message carrying data.

Specifically, after the power adjustment module 12 adjusts the currently used transmit power according to the obtained channel state information, the message sending module 13 may send the message to the station device according to the transmit power determined by means of the adjustment.

During implementation of this embodiment of the present disclosure, state information of a channel between a wireless access point device and a station device may be obtained, and the channel state information is compared with pre-obtained reference channel state information; therefore, a transmit power currently used by the wireless access point device is adjusted according to a result of the comparison, a transmit power corresponding to the channel state information is determined, and a message is sent to the station device based on a transmit power after the adjustment. In this way, the transmit power for sending the message may be adjusted according to a status of the channel between the wireless access point device and the station device. Therefore, unnecessary power overheads and a waste of energy are avoided.

Figure 4:
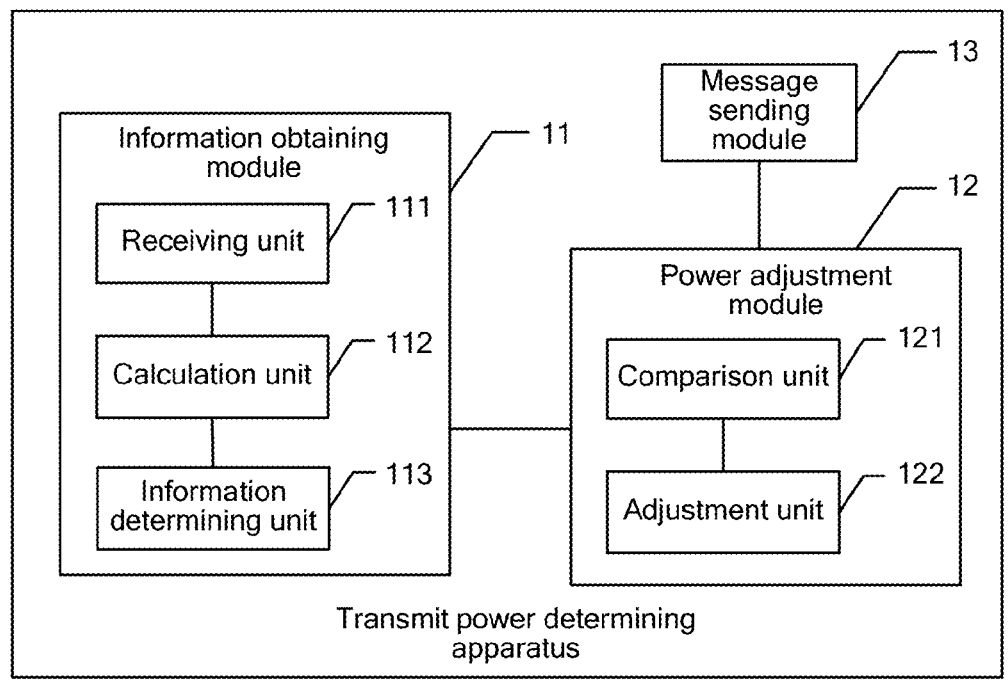
FIG. 4 is a schematic structural diagram of another transmit power determining apparatus according to an embodiment of the present disclosure.

Referring to FIG. 4, FIG. 4 is a schematic structural diagram of another transmit power determining apparatus according to an embodiment of the present disclosure. Specifically, the apparatus may include an information obtaining module 11, a power adjustment module 12, and a message sending module 13.

The information obtaining module 11 is configured to calculate channel state information of a channel between the wireless access point device and a station device within a particular time range.

The channel state information is used to indicate a frame error rate of data transmission on the channel within the particular time range.

It should be noted that the wireless access point device includes, but is not limited to, a device that can serve as a hotspot, such as a mobile phone, a tablet computer, or a wireless router.

The power adjustment module 12 is configured to compare the channel state information obtained by the information obtaining module 11 with pre-obtained reference channel state information, and adjust, according to a result of the comparison, a transmit power currently used by the wireless access point device.

In an optional embodiment, when the wireless access point device, for example, a mobile phone, serves as a hotspot, the information obtaining module 11 may obtain the channel state information of the channel between the wireless access point device and the station device within the particular time range, for example, calculate a frame error rate corresponding to a status of a downlink corresponding to the wireless access point device, and the power determining module 12 compares the channel state information obtained by the information obtaining module 11 with the pre-obtained reference channel state information, so that the transmit power currently used by the wireless access point device is adjusted according to the result of the comparison, and a transmit power for sending data to the station device is determined. The frame error rate is a parameter used to indicate a probability of failing to send data in a process of data transmission between the wireless access point device and the station device, and the station device may be a terminal device, such as a mobile phone or a tablet computer.

Specifically, when the power adjustment module 12 compares the channel state information, which is obtained through calculation, with the pre-obtained reference channel state information, and adjusts the currently used transmit power according to the result of the comparison, the power adjustment module 12 may reduce the transmit power currently used by the wireless access point device when the channel state information is superior to the reference channel state information and a channel status is relatively good, that is, the obtained frame error rate is relatively low; and the power adjustment module 12 increases the currently used transmit power when the channel state information is not superior to the reference channel state information and the channel status is relatively poor, that is, the obtained frame error rate is relatively high, so as to implement a real-time adjustment to the data transmit power according to the status of the channel between the wireless access point device and the station device, and reduce unnecessary power overheads.

The message sending module 13 is configured to send, to the station device by using a transmit power after the adjustment by the power adjustment module 12, a message carrying data.

Specifically, after the power adjustment module 12 adjusts the currently used transmit power according to the obtained channel state information, the message sending module 13 may send the message to the station device according to the transmit power determined by means of the adjustment.

Further, in an optional embodiment, the information obtaining module 11 includes:

a receiving unit 111, configured to receive an acknowledgement ACK frame returned by the station device in response to a message frame that is sent by the wireless access point device on the channel, where in an optional embodiment, after sending the message frame to the station device, the receiving unit 111 may monitor a response status of the station device for the message frame, and receive information about the acknowledgement ACK frame that is returned in response to the message frame;

a calculation unit 112, configured to calculate the frame error rate of the channel within the particular time range according to a quantity of message frames that are sent by the wireless access point device to the station device on the channel within the particular time range and a quantity of acknowledgement ACK frames received by the receiving unit 111 within the particular time range; and an information determining unit 113, configured to use the frame error rate as the channel state information of the channel.

Specifically, the calculation unit 112 may obtain, by means of statistics collection according to the information about the received ACK frames, the frame error rate used to record a probability of failing to send data in a process of data transmission between the wireless access point device and the station device, and the information determining unit 113 may determine the state information of the channel between the wireless access point device and the station device according to the frame error rate, to further determine the data transmit power according to the channel state information. Specifically, when sending the message frame to the station device, the receiving unit 111 may record sending information about the message frame, for example, a quantity of sent message frames, and receive an ACK frame that is fed back by the station device in response to the message frame; the calculation unit 112 obtains a frame error rate corresponding to the channel between the wireless access point device and the station device according to a quantity of message frames sent and a quantity of ACK frames received by the wireless access point device within the particular time range, for example, five minutes; the information determining unit 113 may determine the frame error rate as the channel state information.

In an optional embodiment, the power adjustment module 12 may specifically include:

a comparison unit 121, configured to compare the channel state information obtained by the information obtaining module 11 with the pre-obtained reference channel state information; and an adjustment unit 122, configured to perform, according to a pre-obtained adjustment mapping relationship, an adjustment operation, which corresponds to the result of the comparison, on the transmit power currently used by the wireless access point device.

The adjustment mapping relationship is a pre-obtained mapping relationship between a comparison result and an adjustment operation.

Further optionally, the pre-obtained reference channel state information includes a frame error rate threshold; and the adjustment unit 122 is specifically configured to:

when the result of the comparison is that the frame error rate is less than the frame error rate threshold, adjust the transmit power for sending, to the station device, the message carrying data to a transmit power that is less than the currently used transmit power by a preset power value.

Further optionally, the adjustment unit 122 may be further configured to:

when the result of the comparison is that the frame error rate is greater than the frame error rate threshold, adjust the transmit power for sending, to the station device, the message carrying data to a transmit power that is greater than the currently used transmit power by a preset power value.

Further, the power adjustment module 12 is further configured to: when the frame error rate is equal to the frame error rate threshold, determine the transmit power currently used by the wireless access point device as the transmit power for sending the message to the station device.

In a specific embodiment, a minimum scale, that is, a preset power value, for the power adjustment may be preset. When the information obtaining module 11 obtains the frame error rate through calculation, and the power adjustment module 12 detects that the frame error rate is less than or greater than the frame error rate threshold, that is, when the transmit power currently used by the wireless access point device needs to be adjusted, the preset power values may be added to or subtracted from the current transmit power successively, to increase or reduce the transmit power, until the message sending module 13 successfully sends the message, for example, until an ACK frame returned when the station device acknowledges that the message is successfully sent is received. For example, when the frame error rate obtained by the information obtaining module 11 is higher than the preset frame error rate threshold, that is, when the status of the channel between the wireless access point device and the station device is relatively poor, the power determining module 12 may adjust, according to the preset power value, the transmit power for sending the message to the station device. For example, the transmit power is first increased by one preset power value; the message sending module 13 sends the message by using a transmit power after the adjustment; if an ACK frame that is returned by the station device in response to the message is not received, that is, sending of data fails, the power determining module 12 may further increase the transmit power by one preset power value again before the message is sent, until the message is successfully sent.

Further, a maximum transmit power and a minimum transmit power may be further set for the wireless access point device. When the power determining module 12 adjusts the transmit power currently used by the wireless access point device, if the transmit power after the adjustment is greater than the maximum transmit power, the power determining module 12 may determine the maximum transmit power as the transmit power for sending data to the station device; or if the transmit power after the adjustment is less than the minimum transmit power, the power determining module 12 may determine the minimum transmit power as the transmit power for sending data to the station device, so that the transmit power determined by the power determining module 12 always falls between the maximum transmit power and the minimum transmit power. The fixed transmit power value may be an intermediate value between the maximum transmit power and the minimum transmit power, or an arbitrary value between the maximum transmit power and the minimum transmit power, which is not limited in this embodiment of the present disclosure.

During implementation of this embodiment of the present disclosure, a frame error rate corresponding to a status of a downlink between a wireless access point device and a station device may be obtained, a sending power for sending data to the station device is increased when the frame error rate is relatively high, and the sending power for sending data to the station device is decreased when the frame error rate is relatively low, so as to adjust a transmit power currently used by the wireless access point device, and to send data to the station device based on a transmit power after the adjustment, so that the wireless access point device can adjust the data transmit power in real time according to a status of a channel between the wireless access point device and the station device, avoiding unnecessary power overheads and a waste of energy.

Figure 5:
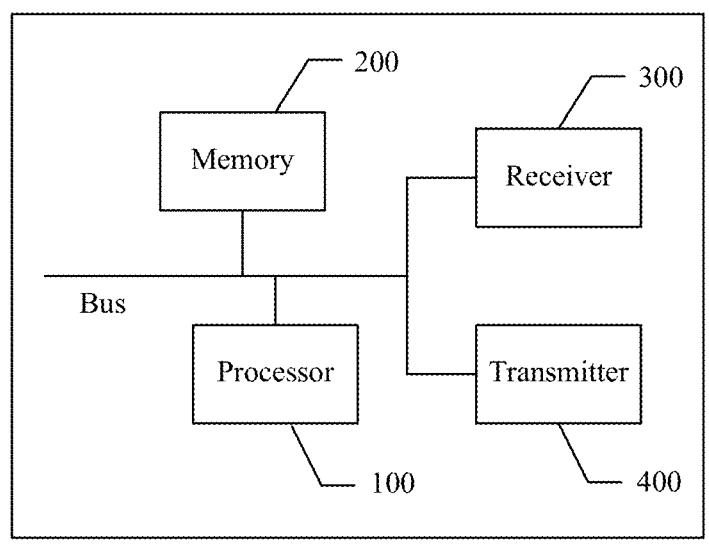
FIG. 5 is a schematic structural diagram of a wireless access point device according to an embodiment of the present disclosure.

Further, refer to FIG. 5, which is a schematic structural composition diagram of a wireless access point device according to an embodiment of the present disclosure. The wireless access point device in this embodiment of the present disclosure includes: a receiver 300, a transmitter 400, a memory 200, and a processor 100. The memory 200 may be a high-speed RAM memory, or may be anon-volatile memory, such as at least one magnetic disk storage. The memory 200, as a computer storage medium, stores a corresponding application program and the like. Data connection may be performed between the receiver 300, the transmitter 400, the memory 200, and the processor 100 by using a bus or in another manner. In this embodiment, descriptions are provided by using a bus connection. Specifically, for the wireless access point device in this embodiment of the present disclosure, refer to related descriptions of the transmit power determining apparatuses in the embodiments corresponding to FIG. 4 and FIG. 5.

The processor 100 performs the following steps:

calculating channel state information of a channel to a station device within a particular time range, where the channel state information is used to indicate a frame error rate of data transmission on the channel within the particular time range;

comparing the channel state information with pre-obtained reference channel state information, and adjusting a currently used transmit power according to a result of the comparison; and sending, to the station device by using a transmit power after the adjustment and based on the transmitter 400, a message carrying data.

In an optional embodiment, when performing the calculating channel state information of a channel to a station device within a particular time range, the processor 100 specifically performs the following steps:

receiving, by using the receiver 300, an acknowledgement ACK frame returned by the station device in response to a message frame that is sent on the channel;

calculating the frame error rate of the channel within the particular time range according to a quantity of message frames that are sent to the station device on the channel within the particular time range and a quantity of acknowledgement ACK frames received within the particular time range; and using the frame error rate as the channel state information of the channel.

In an optional embodiment, when performing the adjusting a currently used transmit power according to a result of the comparison, the processor 100 specifically performs the following step:

performing an adjustment operation, which corresponds to the result of the comparison, on the currently used transmit power according to a pre-obtained adjustment mapping relationship, where the adjustment mapping relationship is a pre-obtained mapping relationship between a comparison result and an adjustment operation.

In an optional embodiment, the pre-obtained reference channel state information includes a frame error rate threshold; and when performing the performing an adjustment operation, which corresponds to the result of the comparison, on the currently used transmit power according to a pre-obtained adjustment mapping relationship, the processor 100 specifically performs the following step:

when the result of the comparison is that the frame error rate is less than the frame error rate threshold, adjusting the transmit power for sending, to the station device, the message carrying data to a transmit power that is less than the currently used transmit power by a preset power value.

In an optional embodiment, the pre-obtained reference channel state information includes a frame error rate threshold; when performing the performing an adjustment operation, which corresponds to the result of the comparison, on the currently used transmit power according to a pre-obtained adjustment mapping relationship, the processor 100 specifically performs the following step:

when the result of the comparison is that the frame error rate is less than the frame error rate threshold, adjusting the transmit power for sending, to the station device, the message carrying data to a transmit power that is less than the currently used transmit power by a preset power value.

During implementation of this embodiment of the present disclosure, state information of a channel between a wireless access point device and a station device may be obtained, and the channel state information is compared with pre-obtained reference channel state information; therefore, a transmit power currently used by the wireless access point device is adjusted according to a result of the comparison, a transmit power corresponding to the channel state information is determined, and a message is sent to the station device based on a transmit power after the adjustment. In this way, the transmit power for sending the message may be adjusted according to a status of the channel between the wireless access point device and the station device. Therefore, unnecessary power overheads and a waste of energy are avoided.

In the foregoing embodiments, the description of each embodiment has respective focuses. For a part that is not described in detail in an embodiment, reference may be made to related descriptions in other embodiments.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A transmit power adjustment method, comprising:
calculating, by a wireless access point device, channel state information of a channel between the wireless access point device and a station device within a particular time range, wherein the channel state information is used to indicate a frame error rate of data transmission on the channel within the particular time range;
comparing, by the wireless access point device, the channel state information with pre-obtained reference channel state information, and adjusting, according to a result of the comparison, a transmit power currently used by the wireless access point device;
sending, by the wireless access point device to the station device by using a transmit power after the adjustment, a message carrying data;
wherein calculating, by the wireless access point device, channel state information of the channel between the wireless access point device and the station device within the particular time range comprises:
receiving, by the wireless access point device, an acknowledgement (ACK) frame returned by the station device in response to a message frame that is sent by the wireless access point device on the channel,
calculating, by the wireless access point device, the frame error rate of the channel within the particular time range according to a quantity of message frames that are sent by the wireless access point device to the station device on the channel within the particular time range and a quantity of acknowledgement ACK frames received within the particular time range, and
using, by the wireless access point device, the frame error rate as the channel state information of the channel.

2. A transmit power adjustment method, comprising:
calculating, by a wireless access point device, channel state information of a channel between the wireless access point device and a station device within a particular time range, wherein the channel state information is used to indicate a frame error rate of data transmission on the channel within the particular time range;
comparing, by the wireless access point device, the channel state information with pre-obtained reference channel state information, and adjusting, according to a result of the comparison, a transmit power currently used by the wireless access point device;
sending, by the wireless access point device to the station device by using a transmit power after the adjustment, a message carrying data; and
wherein adjusting, by the wireless access point device according to the result of the comparison, the transmit power currently used by the wireless access point device comprises:
performing, by the wireless access point device according to a pre-obtained adjustment mapping relationship, an adjustment operation, which corresponds to the result of the comparison, on the transmit power currently used by the wireless access point device, wherein the adjustment mapping relationship is a pre-obtained mapping relationship between a comparison result and an adjustment operation.

3. The method according to claim 2, wherein:
the pre-obtained reference channel state information comprises a frame error rate threshold; and
performing, by the wireless access point device according to the pre-obtained adjustment mapping relationship, the adjustment operation, which corresponds to the result of the comparison, on the transmit power currently used by the wireless access point device comprises:
when the result of the comparison is that the frame error rate is less than the frame error rate threshold, adjusting, by the wireless access point device, the transmit power for sending, to the station device, the message carrying data to a transmit power that is less than the currently used transmit power by a preset power value.

4. The method according to claim 2, wherein:
the pre-obtained reference channel state information comprises a frame error rate threshold; and
performing, by the wireless access point device according to the pre-obtained adjustment mapping relationship, the adjustment operation, which corresponds to the result of the comparison, on the transmit power currently used by the wireless access point device comprises:
when the result of the comparison is that the frame error rate is greater than the frame error rate threshold, adjusting, by the wireless access point device, the transmit power for sending, to the station device, the message carrying data to a transmit power that is greater than the currently used transmit power by a preset power value.

5. A transmit power determining apparatus, wherein the apparatus is disposed in a wireless access point device and comprises:
a processor; and
memory coupled to the processor, the memory comprising instructions that, when executed by the processor, cause the apparatus to:
calculate channel state information of a channel between the wireless access point device and a station device within a particular time range, wherein the channel state information is used to indicate a frame error rate of data transmission on the channel within the particular time range,
compare the channel state information with pre-obtained reference channel state information, and adjust, according to a result of the comparison, a transmit power currently used by the wireless access point device,
send, to the station device by using a transmit power after the adjustment, a message carrying data,
receive an acknowledgement (ACK) frame returned by the station device in response to a message frame that is sent by the wireless access point device on the channel,
calculate the frame error rate of the channel within the particular time range according to a quantity of message frames that are sent by the wireless access point device to the station device on the channel within the particular time range and a quantity of acknowledgement ACK frames received within the particular time range, and
use the frame error rate as the channel state information of the channel.

6. A transmit power determining apparatus, wherein the apparatus is disposed in a wireless access point device and comprises:

a processor; and memory coupled to the processor, the memory comprising instructions that, when executed by the processor, cause the apparatus to:
- calculate channel state information of a channel between the wireless access point device and a station device within a particular time range, wherein the channel state information is used to indicate a frame error rate of data transmission on the channel within the particular time range,
- compare the channel state information with pre-obtained reference channel state information, and adjust, according to a result of the comparison, a transmit power currently used by the wireless access point device,
- send, to the station device by using a transmit power after the adjustment, a message carrying data,
- perform, according to a pre-obtained adjustment mapping relationship, an adjustment operation, which corresponds to the result of the comparison, on the transmit power currently used by the wireless access point device, wherein the adjustment mapping relationship is a pre-obtained mapping relationship between a comparison result and an adjustment operation.

7. The apparatus according to claim 6, wherein:
the pre-obtained reference channel state information comprises a frame error rate threshold; and
the memory further comprises instructions that, when executed by the processor, cause the apparatus to:
- when the result of the comparison is that the frame error rate is less than the frame error rate threshold, adjust the transmit power for sending, to the station device, the message carrying data to a transmit power that is less than the currently used transmit power by a preset power value.

8. The apparatus according to claim 6, wherein:
the pre-obtained reference channel state information comprises a frame error rate threshold; and
the memory further comprises instructions that, when executed by the processor, cause the apparatus to:
- when the result of the comparison is that the frame error rate is greater than the frame error rate threshold, adjust the transmit power for sending, to the station device, the message carrying data to a transmit power that is greater than the currently used transmit power by a preset power value.

9. A wireless access point device, comprising:
a processor, configured to:
- calculate channel state information of a channel between the wireless access point device and a station device within a particular time range, wherein the channel state information is used to indicate a frame error rate of data transmission on the channel within the particular time range, and
- compare the channel state information with pre-obtained reference channel state information, and adjusting, according to a result of the comparison, a transmit power currently used by the wireless access point device;

a transmitter, configured to:
- send to the station device by using a transmit power after the adjustment, a message carrying data;

a receiver, configured to:
- receive an acknowledgement (ACK) frame returned by the station device in response to a message frame that is sent by the wireless access point device on the channel; and wherein the processor is further configured to:
- calculate the frame error rate of the channel within the particular time range according to a quantity of message frames that are sent by the wireless access point device to the station device on the channel within the particular time range and a quantity of acknowledgement ACK frames received by the receiver within the particular time range, and
- use the frame error rate as the channel state information of the channel.

10. A wireless access point device, comprising:
a processor, configured to:
- calculate channel state information of a channel between the wireless access point device and a station device within a particular time range, wherein the channel state information is used to indicate a frame error rate of data transmission on the channel within the particular time range,
- compare the channel state information with pre-obtained reference channel state information, and adjust, according to a result of the comparison, a transmit power currently used by the wireless access point device,
- compare the channel state information with the pre-obtained reference channel state information, and
- perform, according to a pre-obtained adjustment mapping relationship, an adjustment operation, which corresponds to the result of the comparison, on the transmit power currently used by the wireless access point device, wherein the adjustment mapping relationship is a pre-obtained mapping relationship between a comparison result and an adjustment operation; and a transmitter, configured to:
- send, to the station device by using a transmit power after the adjustment, a message carrying data.

11. The wireless access point device according to claim 10, wherein:
the pre-obtained reference channel state information comprises a frame error rate threshold; and
the processor is configured to:
- when the result of the comparison is that the frame error rate is less than the frame error rate threshold, adjust the transmit power for sending, to the station device, the message carrying data to a transmit power that is less than the currently used transmit power by a preset power value.

12. The wireless access point device according to claim 10, wherein:
the pre-obtained reference channel state information comprises a frame error rate threshold; and
the processor is configured to:
- when the result of the comparison is that the frame error rate is greater than the frame error rate threshold, adjust the transmit power for sending, to the station device, the message carrying data to a transmit power that is greater than the currently used transmit power by a preset power value.

* * * * *